UNITED STATES PATENT OFFICE.

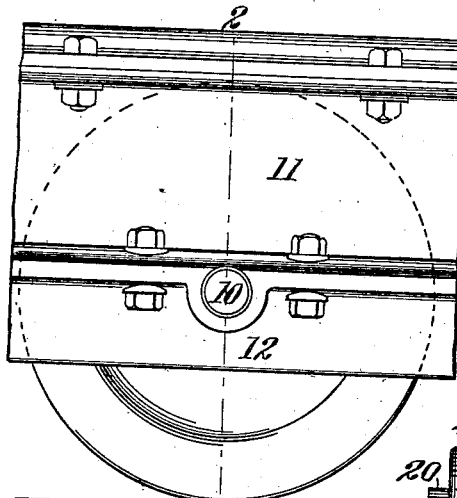
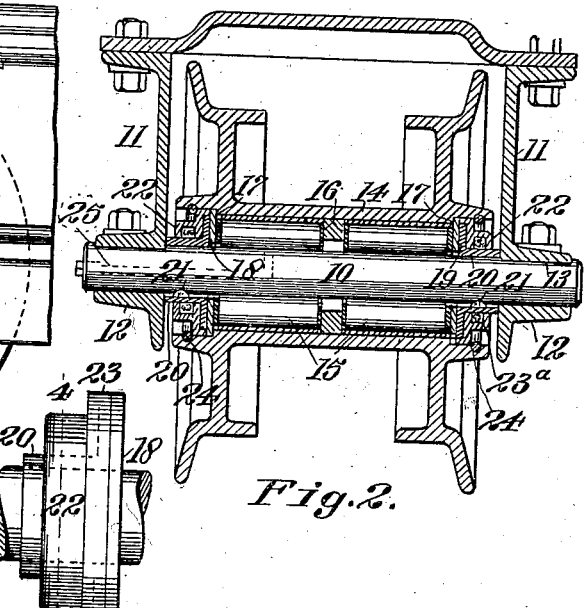
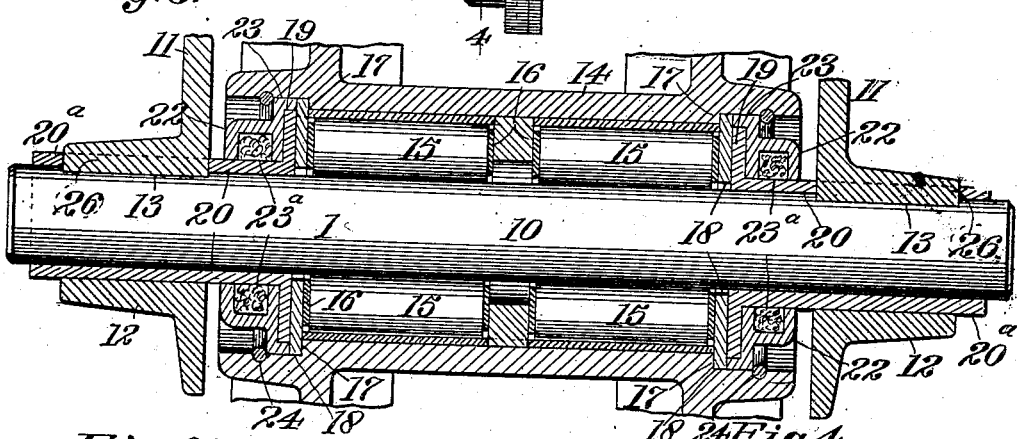
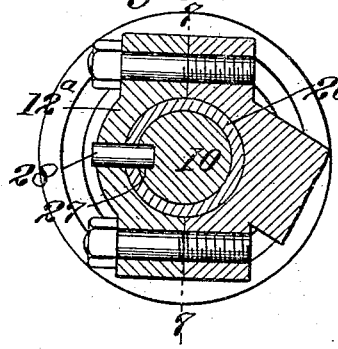

ELMER E. WICKERSHAM, OF STOCKTON, CALIFORNIA, ASSIGNOR TO THE HOLT MANUFACTURING COMPANY, OF STOCKTON, CALIFORNIA, A CORPORATION OF CALIFORNIA.

END-THRUST ROLLER-BEARING.

1,304,430.   Specification of Letters Patent.   Patented May 20, 1919.

Application filed January 24, 1918. Serial No. 213,471.

*To all whom it may concern:*

Be it known that I, ELMER E. WICKERSHAM, a citizen of the United States, residing at Stockton, in the county of San Joaquin and State of California, have invented new and useful Improvements in End-Thrust Roller-Bearings, of which the following is a specification.

This invention relates to roller bearings, and more particularly to roller bearings designed to withstand lateral thrust as well as radial loads.

In bearings of this sort, it has been the common practice either to employ a double set of conical rollers whereby to resist heavy end thrusts or to provide thrust collars or other means independent of the roller bearings for this purpose, no adequate means being known whereby cylindrical roller bearings could be made to perform this function. It has been found, however, that the above mentioned devices are impracticable when used under the severe working conditions and heavy end thrusts encountered by bearings, such as those of the rollers on the roller trucks of self-laying track tractors.

The object of the present invention, therefore is to provide a cylindrical roller bearing capable of operating under the conditions mentioned and of resisting substantial lateral thrust.

In carrying out this object a supporting member, such as a stationary spindle or gudgeon, is provided with a flanged thrust sleeve held in fixed relation to said gudgeon. This sleeve extends into the hub of a supported or rotating member and engages the outer surface of a flange secured interiorly of the hub and adjacent the ends of the cylindrical rollers on which the rotating member is supported. An annular oil-retaining and dust-proof collar is fitted over the flanged thrust sleeve and extends into the hub of the rotating member.

Several forms which my invention may assume are exemplified in the following description and illustrated in the accompanying drawings, in which—

Figures 1 and 2 show the invention as applied to the roller of a roller truck for self-laying track tractors; Fig. 1 being a fragmentary end elevation of such a roller and Fig. 2 being a cross sectional view on the line 2—2 of Fig. 1.

Fig. 3 is an elevational view of the assembled thrust-resisting means.

Fig. 4 is a cross section on line 4—4 of Fig. 3.

Fig. 5 is a cross sectional view of a modified form of the invention.

Figs. 6 and 7 show a method adopted in practice in applying the invention to the sprockets which carry the endless, self-laying tracks of creeper tractors.

The particular form of the invention shown and described herein comprises a spindle or shaft 10 secured to supporting members 11 by means of caps 12. This spindle is held against rotation by means of recesses 13 which engage the supporting members 11 when the caps 12 are secured in place. A rotatable member having a hollow hub 14 is supported on the spindle 10 by cylindrical rollers 15. The rollers 15 are held in position by a suitable cage or retainer 16.

Formed in each end of the hub 14 is a shoulder 17, against which washers 18 are seated. The size of the washers 18 is such that they fit snugly within the open ends of the hub 14 and are thus made to rotate therewith, holding the rollers 15 in place. Engaging the outer sides of these washers are flanges 19, carried by sleeves 20 and preferably formed integral therewith.

In the form of the invention shown in Figs. 1 and 2, the sleeves 20 are held against rotation by means of circular keys 21 and against lateral movement on the spindle 10 by contacting at their outer ends with the supporting members 11. The washers 18 and flanges 19 thus provide broad substantial wearing surfaces interiorly of the rotatable member to receive thrust loads and hold said member against lateral movement on its spindle. All dust and dirt are prevented from reaching these wearing surfaces by means of collars 22 having their inner edges fitting loosely over the sleeves 20 and their outer edges provided with horizontally extending flanges 23 embracing the outer edges of the flanges 19.

A felt washer 23ª is fitted within the inner edge of each of the collars 22 to prevent loss of lubricant from the bearing or the admission of dust and dirt thereto. The outer dimensions of the collars 22 are such that they firmly engage the interior of the hub 14 and rotate therewith, an annular spring 24 being also provided to retain the collars 22 in position.

From this description it is apparent that the stationary flange 19 within the hub 14 is entirely surrounded by the moving washers 18 and collars 22, so that by means of lubricant forced into all parts of the bearing through a duct 25 in the spindle 10 the working parts may be kept perfectly lubricated and free from dust or dirt.

Modified forms of means to hold the sleeves 20 in position are shown in Figs. 5, 6 and 7. In Fig. 5 the sleeves 20 have extensions 20ª formed thereon, in which recesses 26 are cut to correspond to the recesses 13 in the spindle 10. When the caps 12ª are bolted in place, the sleeves 20 are thus held in fixed relation to the spindle 10 and the supporting members 11 just as in the construction shown in Fig. 2. Similarly, in Figs. 6 and 7 the sleeves 20 are shown with extensions 20ª, in which holes 27 are formed to receive dowel pins 28 carried by the caps 12ª. When, therefore, the caps 12ª are secured in place the sleeves are firmly held against rotation and against lateral movement on the spindle 10.

As before stated, the form of Fig. 2 shows how the invention has been applied in actual practice to the trucks and truck rollers of creeper tractors and the form of Fig. 6 and 7 to the sprockets thereof, but the invention is manifestly one of quite general adaptation and use.

Having thus described my invention, what I claim and desire to secure by Letters Patent is—

1. An end thrust roller bearing comprising in combination a hollow hub, a shaft member with roller bearings on which the hub is rotatable, and end thrust means for the rollers comprising a stationary, radial flange housed within the end of the hub, and a washer member in sliding contact with the face of the flange and rotating with the hub.

2. An end thrust roller bearing comprising in combination a hollow hub, a shaft member with roller bearings on which the hub is rotatable, end thrust means for the rollers comprising a stationary, radial flange housed within the end of the hub, a washer member in sliding contact with the face of the flange and rotating with the hub, and a gland inclosing the stationary flange and loosely mounted thereon.

3. An anti-friction bearing comprising relatively rotatable supporting and supported members, cylindrical rollers interposed between said members, and intermeshing means carried by each of said members to prevent lateral movement of said members relatively to one another, said means comprising a flanged sleeve secured to one of said members and extending within and engaging a flange secured in the other member at the ends of the rollers.

4. An anti-friction bearing comprising relatively rotatable supporting and supported members, cylindrical rollers interposed between said members, means to prevent relative lateral movement of said members, comprising a flanged sleeve secured to one of said members and extending within and engaging a flange secured in the other member at the end of the rollers, and means to prevent loss of lubricant from and admission of dust to the bearing, said means comprising a collar embracing the flanged sleeve and provided with an oil retaining washer.

5. An anti-friction bearing comprising a spindle, a rotatable member supported therein, cylindrical rollers interposed between the spindle and the rotatable member, means to prevent lateral movement of the rotatable member relatively to the spindle comprising a flanged sleeve secured to the spindle and extending within the rotatable member and engaging a flange secured therein at the end of the rollers, and means to secure said flanged sleeve in place on the spindle.

6. An anti-friction bearing comprising a spindle, a rotatable member supported therein, cylindrical rollers interposed between the spindle and the rotatable member, means to prevent lateral movement of the rotatable member relatively to the spindle comprising a flanged sleeve secured to the spindle and extending within the rotatable member and engaging a flange secured therein at the end of the rollers, means to secure said flanged sleeve in place on the spindle, and means to prevent loss of lubricant from and admission of dust to the bearing, said means comprising a washer fitting over the flanged sleeve and embracing the outer edge of the flange thereon, and means to retain said washer in the rotatable member.

In testimony whereof I have hereunto set my hand in the presence of two subscribing witnesses.

ELMER E. WICKERSHAM.

Witnesses:
W. W. HEALEY,
M. E. EWING.